United States Patent
O'Neill

(10) Patent No.: US 6,517,445 B1
(45) Date of Patent: Feb. 11, 2003

(54) COMBINATION GOLF CLUB AND WEEDING DEVICE

(76) Inventor: Mike O'Neill, 2-3610 E. Cliff Dr., Santa Cruz, CA (US) 95062

( * ) Notice: Subject to any disclaimer, the term of this patent is extended or adjusted under 35 U.S.C. 154(b) by 0 days.

(21) Appl. No.: 09/929,402

(22) Filed: Aug. 14, 2001

(51) Int. Cl.⁷ ................................................ A63B 69/36
(52) U.S. Cl. ...................................... 473/226; 172/378
(58) Field of Search ................................ 473/219, 226, 473/228, 282, 286, 328, 324; 172/378

(56) References Cited

U.S. PATENT DOCUMENTS

| | | | |
|---|---|---|---|
| 4,951,951 A | * | 8/1990 | Meyer |
| 5,803,830 A | * | 9/1998 | Austin |
| 5,863,261 A | * | 1/1999 | Eggiman |
| 6,270,424 B1 | * | 8/2001 | Holub |

* cited by examiner

Primary Examiner—Stephen Blau
(74) Attorney, Agent, or Firm—Mehlin Dean Matthews

(57) ABSTRACT

A combination golf club and weeding device is disclosed. A cutter is attached to the lower portion of the club head and oriented so that weeds can be cut by swinging the club in the same fashion as is used in striking a golf ball. The shape of the cutter requires that the club be swung accurately in order to achieve a successful cut. When the cutter is retrofitted to a conventional club, reliefs are cut in the club head so that the entire assembly has the same mass and moment of inertia as the original club.

12 Claims, 2 Drawing Sheets

COMBINATION GOLF CLUB AND WEEDING DEVICE

BACKGROUND OF THE INVENTION

1. Field of the Invention

This invention relates to devices used for removing weeds, specifically to a device that also serves as a device for practicing ones golf swing.

2. Description of Related Art

The related art consists of two classes of devices, the first one used for removing weeds from soil and the second one used for practicing one's golf swing.

With regard to the first class of prior art, there have been many devices produced for removing weeds that are used by swinging them. U.S. Pat. Nos. 5,390,746 and 4,832,132 discuss the use of hand weeding devices that are used by swinging in a fashion that is roughly similar to the manner of swinging a golf club. Although the prior art devices may be used by swinging the devices in the manner of swinging a golf club, there are significant differences in shape and mass distribution between the prior art devices and a golf club. These differences preclude any meaningful training effect with regard to the use of a golf club.

With regard to the second class of prior art, there have been many devices produced for the purpose of perfecting one's golf swing. These devices are single purpose devices that do not have any additional utility with respect to removing weeds.

BRIEF SUMMARY OF THE INVENTION

It is thus an object of the present invention to provide a device that is useful for removing weeds while simultaneously providing a training effect for improving one's golf swing.

It is another object of the invention to provide a device that can be used to convert a typical golf club into a weeding device.

DETAILED DESCRIPTION OF THE INVENTION

Figure 1:
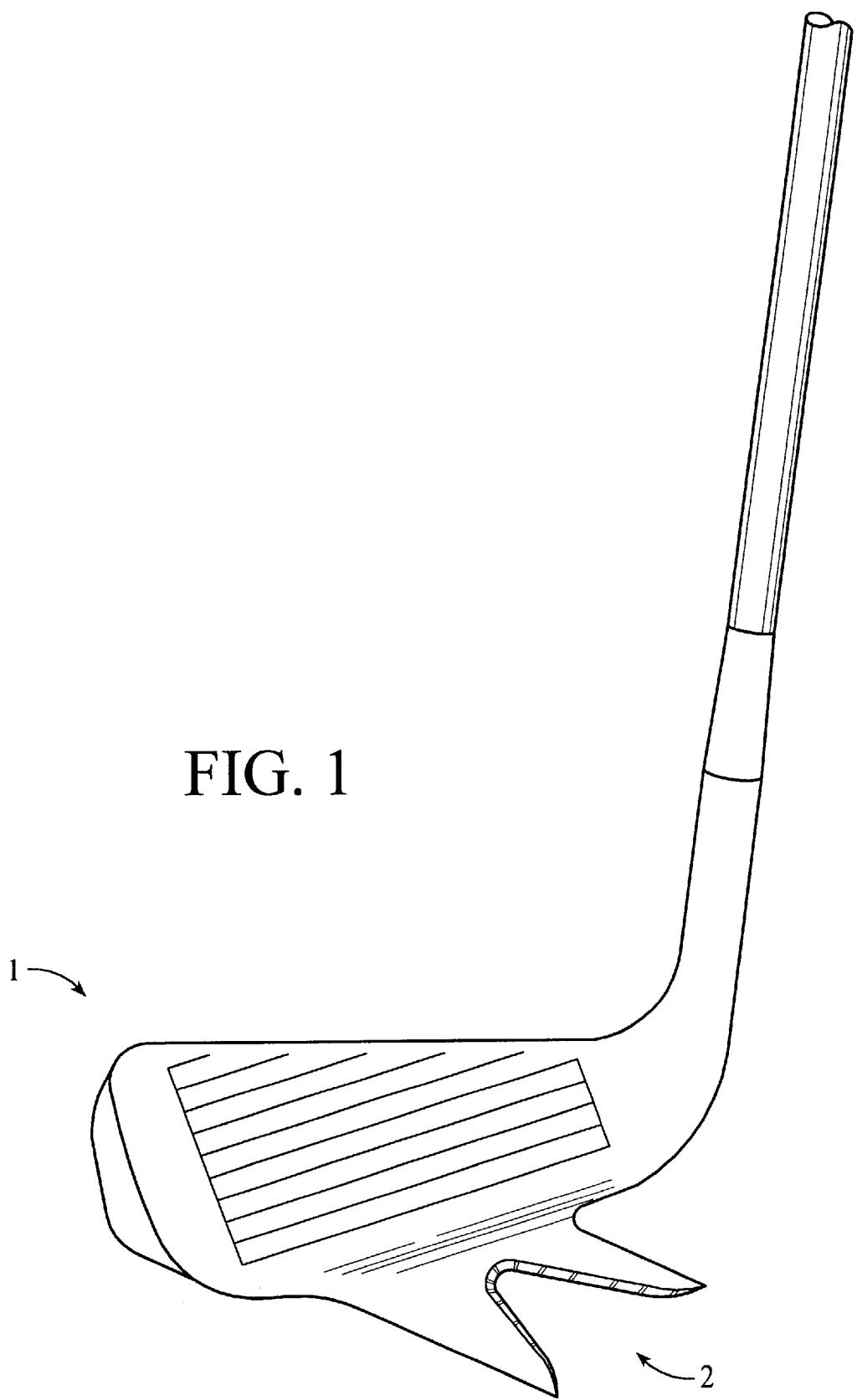
FIG. 1 shows the invention in its monolithic embodiment.

In the embodiment of FIG. 1 the club head 1 of a golf club is shown with two blades forming a "V"-shaped cutter 2. In this case the club shown is an iron and the cutter 2 and the club head 1 are a single integrated unit formed by a process such as casting. The cutter 2 extends from the lower edge of the face of the club head 1 at an angle such that the cutter 2 is essentially parallel to the ground when the face of the of the club head 1 is in its optimum orientation for hitting a golf ball. The preferred material of construction is iron or an iron alloy with sufficient carbon content to allow surface hardening of the blades of the cutter 1, while maintaining a tough core. Examples of suitable materials are stainless steel casting alloys and ductile iron. Surface hardening by flame or induction heating will provide wear resistance for the blade edges and the tough core will prevent hazardous fracture of the blades through impact.

The combination of the "V"-shape and specific orientation of the cutter 2 produce a golf club that is useful for cutting weeds by swinging the club so that the "V" shaped notch in the cutter 2 engages the stalk of the weed being cut (e.g. milkweed). The best result in cutting a weed is obtained when the golf club is swung in the optimum manner for hitting a golf ball positioned at the location of the base of the weed stalk. A proper swing of the modified club will shear the stalk of the weed close to the ground. The process of addressing a particular weed, swinging, and cutting closely simulates the process of carrying out a golf shot. The weed cutting operation produces visual feedback that through repetition can produce a beneficial training effect in addition to removing unwanted weeds. The "V" shape of the blades requires that an accurate swing be made in order to obtain a clean cut when only the blade edges inside the "V" is are sharpened.

Figure 2:
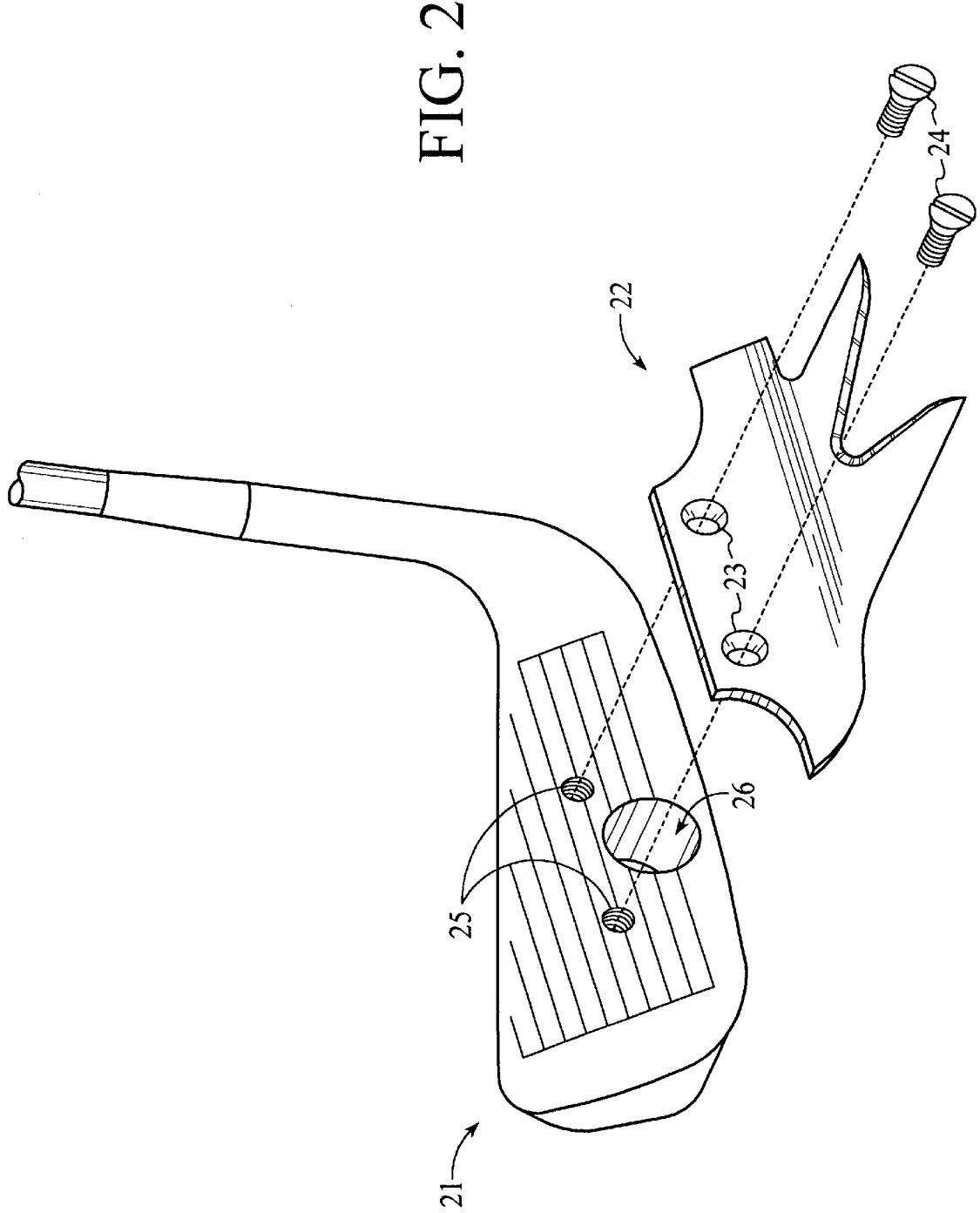
FIG. 2 shows the invention with a detachable blade retrofitted to a typical club face.

FIG. 2 shows an embodiment of the invention that can be produced by the modification of a conventional golf club. In this case the club head 21 of a conventional iron has been drilled and tapped to provide two tapped mounting holes 25 that accept two flat-head mounting screws 24. The cutter 22 has two countersunk through holes 23 to accept the mounting screws 24. The countersunk holes in the cutter 22 allow it to be securely fastened to the club head 21 by the mounting screws 24. One or more relief holes 26 can also be bored in the club head so that the entire assembly has a weight and moment of inertia that more closely matches that of the unmodified club. The size and location of the relief holes 26 is determined by the cutter 22. The cutter 22 is preferably made of an alloy that can be surface hardened such as tool steel or martensitic stainless steel.

The use of a detachable cutter 22 simplifies the manufacture of the entire assembly since conventional golf clubs can be purchase and modified. The detachable cutter 22 also simplifies sharpening and replacement.

It will be apparent to one skilled in the art that modifications to the proportions and shape of the components of the invention may be made without departing from the scope and spirit of the invention as claimed.

What is claimed:

1. A combination golf club and weeding device comprising:
   (a) a golf club comprising a club head and a club head face; and
   (b) a cutter extending from a lower edge of the club head face and at an angle from said face, said cutter comprising a sharpened edge that extends from said club head face and is approximately coplanar with the bottom surface of the head of said golf club, wherein when said club is swung in an optimum manner for hitting a golf ball positioned at a location at a base of a weed stalk, said cutter edge will shear the stalk of weed close to the ground.

2. The device of claim 1 wherein said sharpened edge is formed as a "V" shaped notch.

3. The device of claim 2 wherein said cutter is detachable from said golf club.

4. The device of claim 1 wherein said cutter is detachable from said golf club.

5. A combination golf club and weeding device comprising:
   (a) a golf club comprising a club head and a club head face; and
   (b) a cutter extending from a lower edge of the club head face, said cutter extending a sharpened edge that extends from said club head face and is approximately coplanar with the bottom surface of the head of said golf club; and (c) voids disposed within said club head such that the product of the volume of said voids and the density of the club head material is approximately equal to the mass of said cutter.

6. The device of claim 5, wherein said cutter comprises an iron alloy with sufficient carbon to allow surface hardening of said cutter.

7. The device of claim 5, wherein said cutter comprises hardened blades and a tough core.

8. A combination golf club and weeding device comprising
   (a) a golf club comprising a club head and a club head face; and
   (b) a cutter extending from a lower edge of the club head face at an angle such that the cutter is essentially parallel to the ground when the club head face is in its optimum orientation for hitting a golf ball wherein when said club is swung in an optimum manner for hitting a golf ball positioned at a location at a base of a weed stalk, said cutter edge will shear the stalk of weed close to the ground.

9. The device of claim 8 wherein said sharpened edge is formed as a "V" shaped notch.

10. The device of claim 9 wherein said cutter is detachable from said golf club.

11. The device of claim 10 wherein said club head of said golf club contains voids such that the product of the volume of said voids and the density of the club head material is approximately equal to the mass of said cutter.

12. The device of claim 8 wherein said cutter is detachable from said golf club.

* * * * *